(12) United States Patent
Martens

(10) Patent No.: US 6,532,729 B2
(45) Date of Patent: Mar. 18, 2003

(54) SHELF TRUNCATED CHEVRON EXHAUST NOZZLE FOR REDUCTION OF EXHAUST NOISE AND INFRARED (IR) SIGNATURE

(75) Inventor: Steven Martens, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/871,263

(22) Filed: May 31, 2001

(65) Prior Publication Data

US 2002/0178711 A1 Dec. 5, 2002

(51) Int. Cl.$^7$ .............................................. B63H 11/00
(52) U.S. Cl. ......................... 60/204; 60/39.5; 60/264; 60/271; 239/265.19; 171/206
(58) Field of Search .................. 60/39.5, 204, 262, 60/263, 264, 271, 770; 239/215.17, 265.19; 181/206, 213, 220

(56) References Cited

U.S. PATENT DOCUMENTS

| | | | |
|---|---|---|---|
| 3,153,319 A | * 10/1964 | Young et al. | 239/265.19 |
| 3,215,172 A | 11/1965 | Ardoin | 181/43 |
| 3,568,792 A | * 3/1971 | Uquhart | 239/265.19 |
| 3,648,800 A | 3/1972 | Hoerst | 239/265.19 |
| 4,284,170 A | 8/1981 | Larson et al. | 239/265.19 |
| 4,311,291 A | 1/1982 | Gilbertson et al. | 239/265.19 |
| 6,314,721 B1 | * 11/2001 | Mathews et al. | 60/264 |
| 6,360,528 B1 | * 3/2002 | Brausch et al. | 60/262 |

FOREIGN PATENT DOCUMENTS

| | | |
|---|---|---|
| EP | 913567 | 5/1999 |
| GB | 2146702 | 4/1985 |
| GB | 2289921 | 12/1995 |
| JP | 02000145475 A | * 5/2000 |

OTHER PUBLICATIONS

Kandebo, "GE Team To New JSF Nozzle," Av. Week & Space Tech., Apr. 15, 1996, p. 24.

* cited by examiner

Primary Examiner—Charles G. Freay
Assistant Examiner—John Belena
(74) Attorney, Agent, or Firm—Nathan D. Herkamp; Francis L. Conte

(57) ABSTRACT

An exhaust nozzle includes an annular exhaust duct for discharging exhaust from an aft end thereof. Circumferentially adjoining chevrons extend from the duct aft end around only an arcuate portion thereof leaving a plain arcuate shelf between terminal ones of the chevrons. Each of the chevrons has a triangular configuration and a compound arcuate contour both circumferentially and axially.

31 Claims, 6 Drawing Sheets

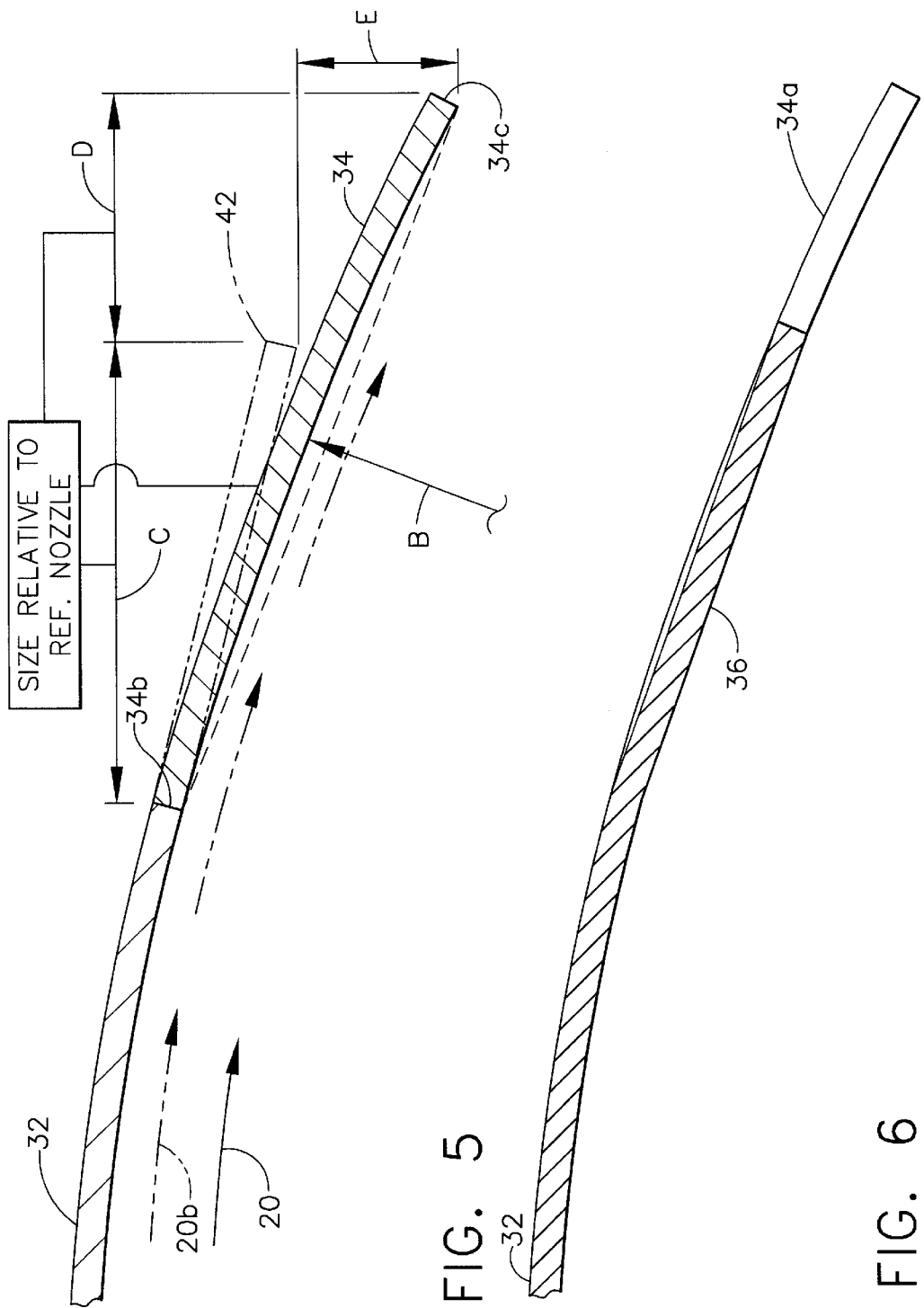

US 6,532,729 B2

SHELF TRUNCATED CHEVRON EXHAUST NOZZLE FOR REDUCTION OF EXHAUST NOISE AND INFRARED (IR) SIGNATURE

CROSS REFERENCE TO RELATED APPLICATION

The present invention is related to U.S. patent application Ser. No. 08/961794, now U.S. Pat. No. 6,360,528.

BACKGROUND OF THE INVENTION

The present invention relates generally to gas turbine engines, and, more specifically, to reduction of exhaust noise and infrared (IR) signature.

A turbofan aircraft gas turbine engine includes in serial flow communication a fan, compressor, combustor, high pressure turbine, and low pressure turbine. Air is pressurized in the compressor and mixed with fuel and ignited in the combustor for generating hot combustion gases that flow downstream through the turbine stages which extract energy therefrom for powering the compressor and fan.

The combustion gases are exhausted from the turbines through a downstream core engine exhaust nozzle. And, fan air bypasses the core engine and is discharged through an annular fan exhaust nozzle surrounding the core engine. In this way, two streams of fan exhaust and core exhaust are discharged coaxially from the engine at corresponding velocities which create noise.

Government regulations limit acceptable levels of engine noise as aircraft take off and land at airports, Accordingly, aircraft engines are specifically designed for limiting the amount of noise generated therefrom during operation.

Noise attenuation may be effected by mixing the high velocity core exhaust with the surrounding lower velocity fan exhaust for reducing the peak velocity thereof, and correspondingly reducing noise as well as IR signature. And, the fan exhaust may be mixed with the surrounding lower velocity ambient air for reducing the peak velocity thereof and the associated noise.

In U.S. Pat. No. 6,360,528, a chevron exhaust nozzle is disclosed in various configurations for the core nozzle and fan nozzle for attenuating noise. Triangular chevrons extend aft from an annular exhaust nozzle, and have compound curvature both axially and circumferentially for enhancing mixing of the two flow streams located radially inwardly and outwardly thereof.

The present invention is a continuation in the development of the chevron exhaust nozzle in which a particular problem was discovered and is solved under the present invention. The chevron nozzle has been built and tested in annular form and provides substantial reduction in noise and IR signature.

However, in some mounting configurations of a turbofan aircraft engine with the chevron exhaust nozzle, not only was noise not reduced, but actually increased due to the introduction of the chevron nozzle.

More specifically, a turbofan engine may be mounted to an aircraft using a pylon under a wing or along the side of the fuselage. The pylon is a structural member with a fairing skin which extends along the longitudinal axis of the engine at one circumferential location such as about twelve o=clock for a wing mounted engine, and either three o=clock or nine o=clock for fuselage mounted engines. The pylon thus locally blocks a portion of the fan nozzle and may extend aft from the core nozzle in various lengths and widths.

For example, in one relatively wide and long pylon extending over the core nozzle, testing of an annular chevron nozzle therefor resulted in an increase of noise instead of the intended decrease of noise. Similarly, testing of a chevron fan nozzle interrupted by the pylon failed to produce expected noise attenuation.

Accordingly, it is desired to provide an improved chevron exhaust nozzle for use in conjunction with pylon mounted aircraft engines.

BRIEF SUMMARY OF THE INVENTION

An exhaust nozzle includes an annular exhaust duct for discharging exhaust from an aft end thereof. Circumferentially adjoining chevrons extend from the duct aft end around only an arcuate portion thereof leaving a plain arcuate shelf between terminal ones of the chevrons. Each of the chevrons has a triangular configuration and a compound arcuate contour both circumferentially and axially.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 5 is an axial sectional view through an exemplary chevron of the core nozzle illustrated in FIG. 4 and taken along line 5—5.

FIG. 6 is an axial sectional view through a shelf portion of the core nozzle illustrated in FIG. 4 and taken along line 6—6.

DETAILED DESCRIPTION OF THE INVENTION

Figure 1:
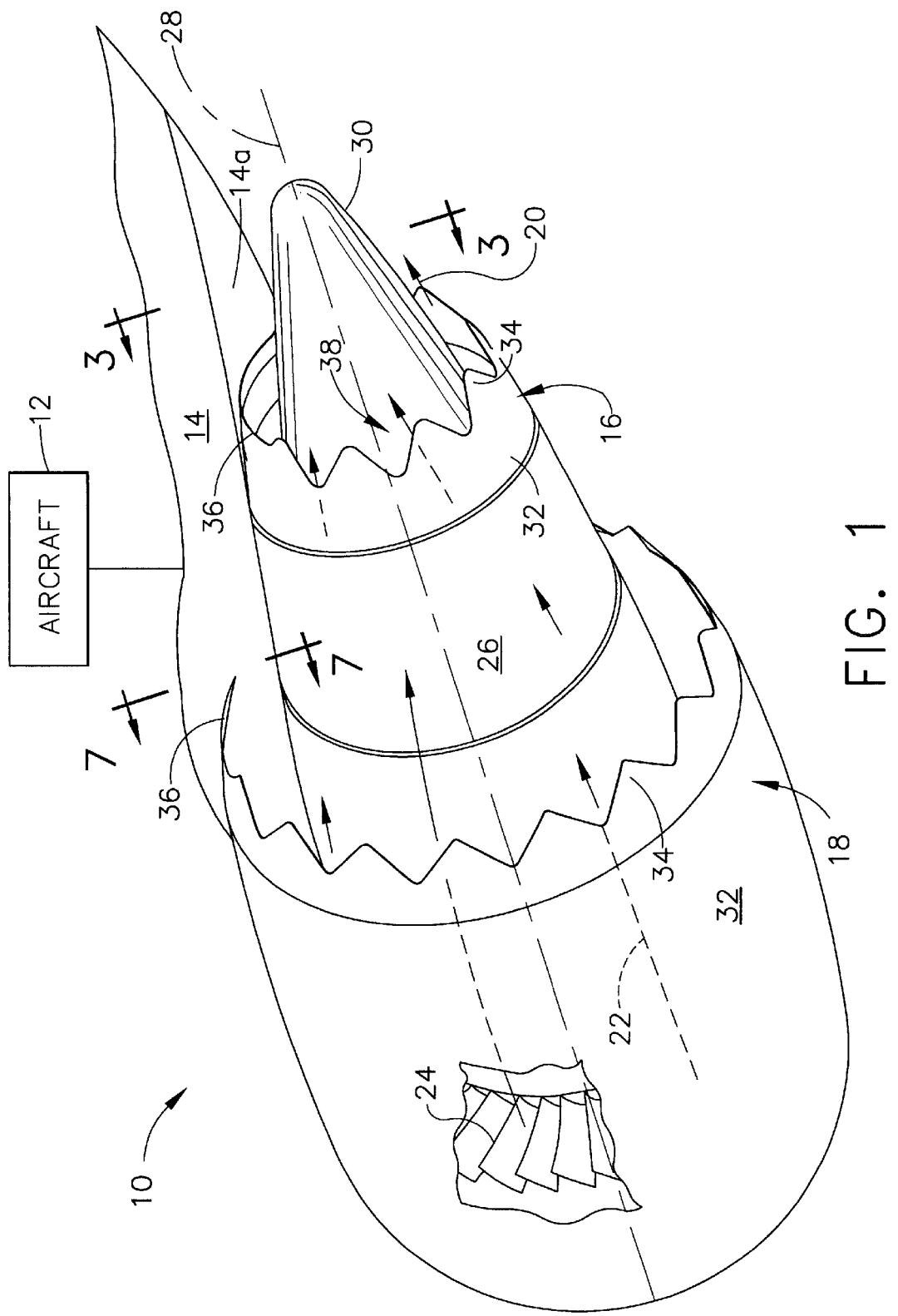
FIG. 1 is an isometric view of an exemplary turbofan aircraft gas turbine engine mounted to an aircraft by a pylon, and including fan and core chevron nozzles in accordance with exemplary embodiments of the present invention.

Illustrated in FIG. 1 is a turbofan aircraft gas turbine engine 10 suitably mounted to the wing of an aircraft 12 by a structural pylon 14 in any conventional manner.

The engine includes a core exhaust nozzle 16 near its aft end, and a fan exhaust nozzle 18 near the middle of the engine which correspondingly discharge combustion gas exhaust 20 and pressurized fan air exhaust 22.

But for the two exhaust nozzles 16, 18, the engine may have any conventional configuration and operation. In the exemplary form of a turbofan engine, a fan 24 having a row of rotor blades is mounted inside the corresponding fan nacelle at the forward end of the engine for pressurizing ambient air which is discharged as the air exhaust 22 through the fan nozzle 18. The fan is driven by a core engine 26 mounted concentrically inside the fan nacelle along an axial or centerline axis 28.

The core engine 26 has an outer nacelle and contains therein a multistage axial compressor which compresses an inner portion of the fan air for mixing with fuel in a downstream combustor for generating hot combustion gases. The core engine also includes a high pressure turbine joined by a shaft to the compressor which extracts energy from the combustion gases for powering the compressor. A low pressure turbine is disposed downstream from the high pressure turbine and is joined to the fan by another shaft that is rotated by extracting additional energy from the combustion gases which are discharged as the core exhaust 20 from the core nozzle 16.

In the exemplary embodiment illustrated in FIG. 1, the pylon 14 is located at the twelve o=clock position of the engine and interrupts the circumferential continuity of the fan nozzle 18, and extends in part circumferentially and in part downstream overhanging the core nozzle 16. Disposed inside the core nozzle is an annular centerbody 30 spaced radially inwardly from the core nozzle and converging in the aft direction downstream therefrom.

As indicated above in the background section, development testing of the chevron nozzle disclosed above has uncovered a problem of interaction between the core and fan exhausts and the pylon, which instead of reducing noise from those flow exhausts has resulted in increased noise.

For example, testing of an annular chevron nozzle of the previous design for the core nozzle has demonstrated a reduction in sideline noise but with an increase in cutback noise which combine for a total increase in noise due to the chevron nozzle, instead of a noise decrease. Sideline and cutback noise are conventional noise evaluation parameters specified by the US Federal Aviation Administration (FAA), with sideline noise being measured at ground level to the side of an aircraft taking off at low altitude, with cutback noise being measured at ground level directly below the low altitude aircraft.

Upon discovering the problem of noise generation due to the interaction between the annular chevron nozzle and the aircraft pylon, a solution therefor has been uncovered. The theory of noise increase due to the chevron nozzle-pylon interaction is not known at this time. However, a solution to this problem has been built and tested and results in a substantial reduction in both sideline and cutback noise generation from the engine due to a new configuration of the core nozzle 16, which has also been successfully applied and tested for the fan nozzle 18 as well.

Figure 2:
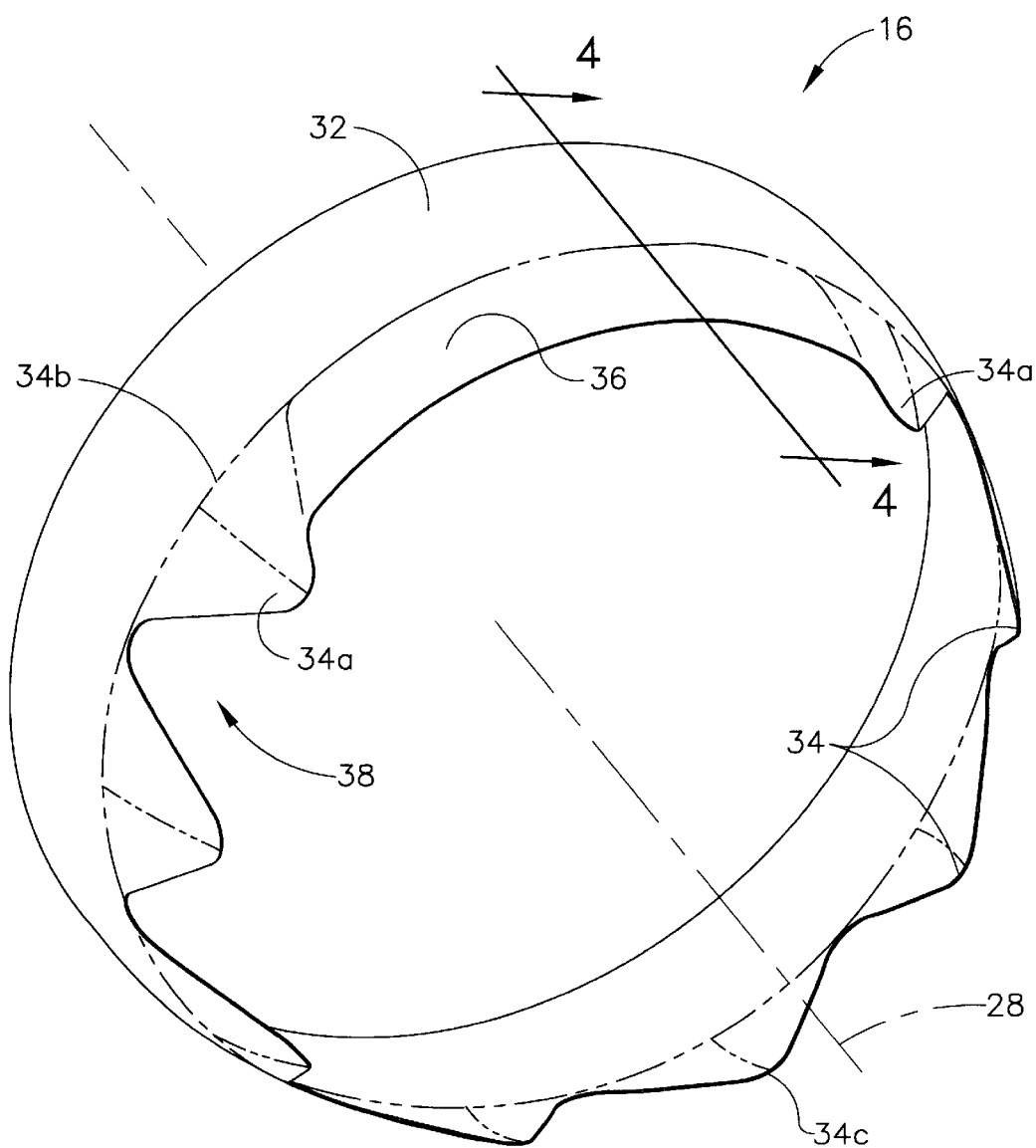
FIG. 2 is an isolated isometric view of the core nozzle illustrated in FIG. 1 in accordance with an exemplary embodiment.
Figure 3:
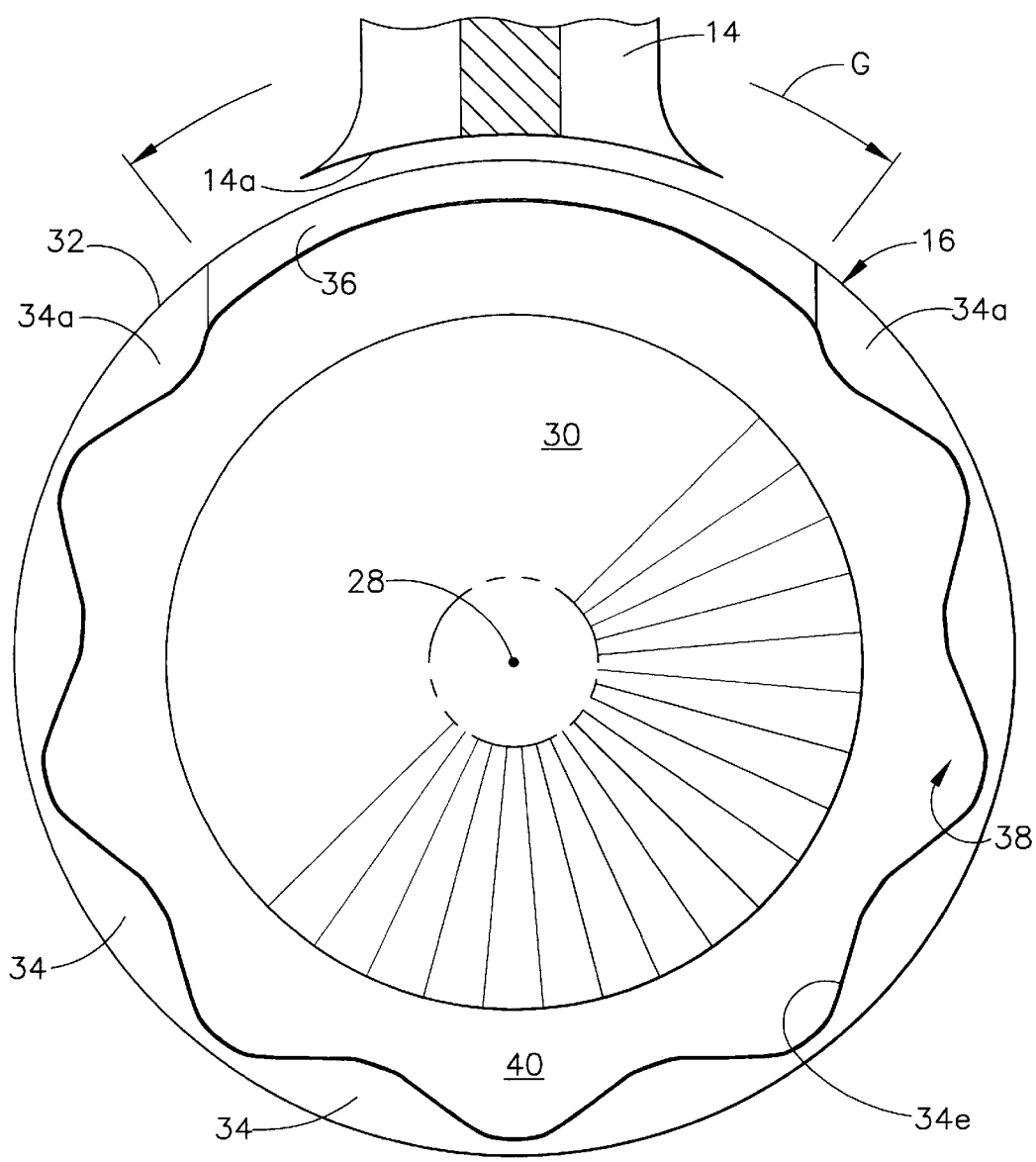
FIG. 3 is an aft-looking-forward elevational end view of the core nozzle of the engine illustrated in FIG. 2 and taken along line 3—3.

The core exhaust nozzle 16 is illustrated in isolated view in FIG. 2 and in aft end view in FIG. 3 in accordance with a specific embodiment of the present invention. The core nozzle includes an annular exhaust duct 32, which is preferably a one-piece or a unitary ring having the centerline axis 28 extending therethrough. A plurality of circumferentially adjoining chevrons 34 extend axially aft from an aft end of the exhaust duct preferably in a unitary and coextensive configuration therewith.

Instead of being uniformly distributed about the circumference of the exhaust duct as found in the previous chevron nozzle design, the present chevrons 34 are disposed around only a major arcuate portion of the duct aft end as illustrated in FIG. 2 leaving a plain or chevron-less minor arcuate shelf 36 extending circumferentially between terminal ones of the chevrons, designated 34a.

The chevrons extend over a major portion of the perimeter of the exhaust duct, with the intervening shelf 36 extending over a minor portion of the perimeter for aerodynamically uncoupling the performance of the chevrons from the adjoining pylon 14 as illustrated in FIGS. 1 and 3. In this way, the chevron core nozzle 16 is circumferentially truncated to eliminate some of the chevrons in the vicinity of the pylon, and replacing those chevrons with a plain arcuate shelf 36 which preferentially separates the terminal chevrons 34a from the opposite sides of the pylon in use.

Figure 4:
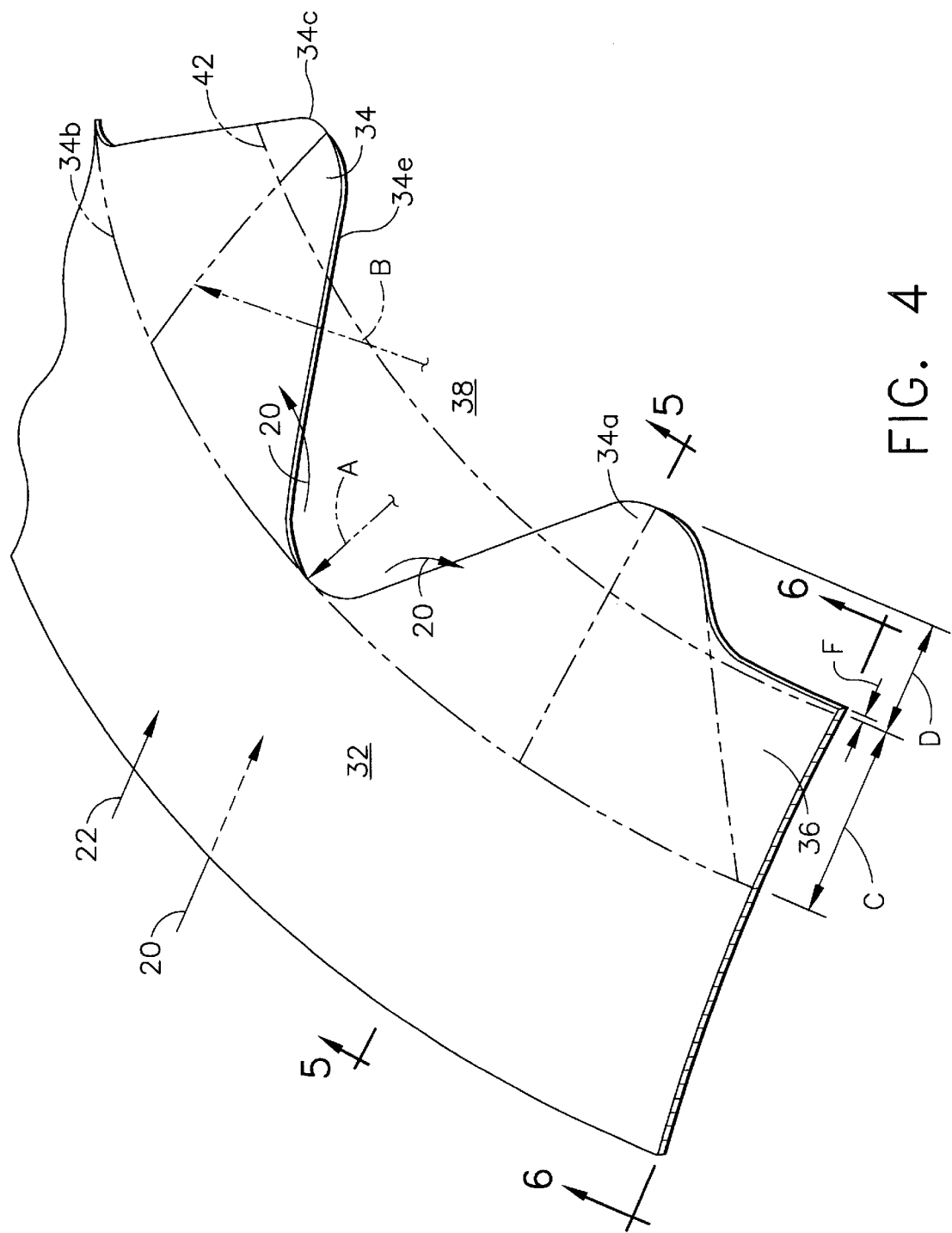
FIG. 4 is an isometric view of a portion of the core nozzle illustrated in FIG. 2 and taken generally along line 4—4.

As illustrated in more detail in FIG. 4, each of the chevrons 34 has a triangular configuration around the circumference of the exhaust duct 32, and includes a compound arcuate contour both circumferentially and axially as disclosed in considerable detail in the above-identified patent. The circumferential curvature of each chevron is defined by a first radius A, with the axial curvature of each chevron being defined by a second radius B.

Each chevron 34 converges in width circumferentially or laterally in the aft direction from the upstream annular duct 32 from a corresponding arcuate base 34b formed integrally with the aft end of the duct to an apex 34c spaced in the aft direction from the chevron base. The converging chevrons define complementary triangular slots 38 extending circumferentially between adjacent chevrons and diverging axially aft for channeling the core exhaust 20 radially therethrough during operation.

The circumferential contour defined by the first radius A may be a portion of a circle and preferably varies axially from the chevron base 34b to the chevron apex 34c to control the circumferential contour of the chevron. Correspondingly, the axial contour of each chevron defined by the second radius B may also vary between the chevron base 34b and apex 34c, and is preferably parabolic.

Accordingly, during operation the core exhaust 20 is discharged from inside the core nozzle while the fan exhaust 22 is discharged outside the core nozzle. The two flow streams intersect each other and mix along the serpentine trailing edges 34e of the chevrons and result in vortices being shed therefrom and increasing in magnitude in a downstream direction. The vortices enhance mixing of the two streams and promote the reduction of noise.

As shown in FIGS. 2 and 3, the arcuate shelf 36 which circumferentially separates the two terminal chevrons 34a is preferably circumferentially coextensive therewith for producing the annular ring structure illustrated. The nozzle is preferably relatively thin in radial thickness and may be formed from suitable sheet metal of constant thickness, or machined metal of variable thickness as desired.

As shown in FIG. 2, all of the chevrons 34 preferably terminate at a common axial plane and therefore have equal axial length. And, the nozzle shelf 36 preferably terminates axially forward of the chevron apexes 34c for maintaining the compound contour of the two terminal chevrons 34a. The trailing edge of the nozzle shelf 36 is preferably located in a single axial plane, with the shelf being axisymmetrical circumferentially along its length between the two terminal chevrons.

In view of the different configurations of the chevrons and shelf, they have correspondingly different contours. As shown in FIGS. 4 and 5, the chevrons are preferably axially concave radially inwardly as identified by the second radius B along the radially inner surface of the chevron. And, the chevrons are preferably also axially convex radially outwardly along their radially outer surfaces due to the substantially constant thickness thereof.

Since the individual chevrons also extend circumferentially around the centerline axis, they have circumferential curvature defined by the first radius A illustrated in FIG. 4 which is different than the axial curvature in the preferred embodiment. In this way, each chevron has a compound, three-dimensional flow surface contour defining a shallow concave depression or bowl along its radially inner surface for promoting mixing effectiveness. The outer surface of each chevron has a correspondingly compound convex contour or hump. And, the compound curvatures of the inner and outer surfaces of each chevron may be defined by simple circular arcs or by parabolic curves, or by higher order quadratic curves as desired.

As shown in FIGS. 4 and 6, the nozzle shelf 36 is circumferentially arcuate and preferably axially straight in the form of a portion of a cone. In view of the different contours of the shelf and the adjoining two terminal chevrons 34a, the compound arcuate contour of the terminal chevrons blends to the different contour at the adjoining shelf. As shown in phantom line in FIGS. 2 and 4, the terminal chevrons 34a are preferably triangular with the same contours as the remainder of the chevrons and blend to the different contour of the intervening shelf 36 at intersection lines therebetween.

In this way, all of the chevrons, including the terminal chevrons, may be designed with the same compound curvature, and then circumferentially separated apart by the nozzle shelf 36 sized in length to separate the terminal chevrons from the opposite sides of the pylon 14 as illustrated in FIG. 3.

As shown in FIGS. 2 and 3 all of the chevrons 34 are preferably equiangularly spaced apart from each other with a larger circumferential spacing between the two terminal chevrons 34a along the intervening shelf 36. The chevrons thusly promote axisymmetrical mixing of the fan and core exhaust streams over a majority of the circumferential extent of the core nozzle, yet uncouple the performance of the chevrons from the adjoining pylon 14.

In this way, substantial reduction of noise and infrared signature from the core exhaust may be obtained notwithstanding the local interaction with the pylon. The theory behind the noise attenuation confirmed by tests is not known at this time, yet significant noise attenuation has been proven as opposed to an increase in noise from the testing of a corresponding axisymmetrical chevron exhaust nozzle of the previous design not having the local shelf in the region of the pylon.

In the embodiment of the core nozzle 16 illustrated in FIGS. 2 and 3, the shelf 36 is preferably circumferentially continuous between the terminal chevrons 34a and the exhaust duct 32 is also circumferentially continuous and coextensive with the shelf and all the chevrons in a preferably unitary or one-piece construction.

As shown in FIG. 3, the annular centerbody 30 is disposed coaxially inside the radially larger exhaust duct 32 to define a fully annular core exhaust outlet 40 through which the core exhaust 20 is discharged during operation. The centerbody is conventional and in the external form illustrated in FIG. 1 extends in most part aft from the chevrons and below the pylon 14, with a minor part of the centerbody extending inside the core nozzle 16. However, an internal-type centerbody could also be used, which terminates near the nozzle outlet.

Testing of the specific embodiment of the core nozzle 16 illustrated in FIGS. 2 and 3 with the intervening nozzle shelf 36 has uncovered that the use of only eight chevrons provides maximum noise attenuation for the core nozzle. Fewer and greater number of chevrons were tested, with eight chevrons providing optimum performance. In alternate embodiments of the core nozzle, the number of chevrons may be changed but should preferably be an equal, as opposed to odd, number of chevrons for maintaining axisymmetric mixing performance around the nozzle and relative to the pylon.

In the preferred embodiment, the terminal chevrons 34a are spaced apart from each other at a pitch spacing of about ninety degrees, with the pitch spacing of all eight chevrons being substantially equal intervals of the two hundred and seventy degree circumferential extent of the chevrons as measured at the corresponding apexes thereof. In alternate embodiments, the pitch spacing between the terminal chevrons may be less than 90 degrees, down to about 45 degrees.

As shown in FIG. 4, the nozzle shelf 36 preferably terminates at its trailing edge in a single axial plane closer to the chevron apexes 34c than to the chevrons bases 34b. In this way, the terminal chevrons extend aft at least in part at the nozzle shelf 36 for providing forced mixing of the two exhaust streams notwithstanding the local interaction with the supporting pylon.

As illustrated schematically in FIG. 5, a preferred method of making or sizing the core nozzle is illustrated. Firstly, a reference nozzle 42 having an aft outlet is defined in any conventional manner for discharging the exhaust stream such as the core exhaust 20. A conventional core nozzle may either be converging only or converging-diverging to its outlet, and has a predetermined discharge flow area and flow coefficient or nozzle discharge coefficient. Core nozzles are conventionally designed for maximizing aerodynamic performance of the turbofan engine over its various operating conditions.

In the exemplary embodiment illustrated in FIG. 5, the reference nozzle 42 is the converging, conical type, with a straight converging cone aft end. Alternatively, the reference nozzle could suitably diverge to its outlet end.

The chevron core nozzle 16 replaces the reference nozzle by preferably locating the chevron bases 34b axially forward from the reference nozzle outlet by a forward distance C, and the chevron apexes 34c are located axially aft from the reference nozzle by a corresponding aft distance D. Since the core trailing edges 34e of the chevrons are serpentine as illustrated in FIGS. 3 and 4, the nozzle outlet 40 has an effective flow area at a corresponding axial plane between the chevron bases and apexes. The chevrons are therefore positioned to axially straddle the outlet of the reference nozzle to effect substantially equal aerodynamic performance.

However, the chevrons may be positioned fully forward of the reference nozzle outlet, or fully aft of that outlet, and the nozzle flow area may be adjusted by tailoring the size, configuration, and position of the centerbody.

As also illustrated in FIG. 5, the chevron bases 34b are preferably located on the reference nozzle 42 at the same radius from the centerline axis corresponding with the preferred axial location of the chevrons. The chevron apexes 34c are then preferably displaced radially from the reference nozzle for preferentially increasing penetration E of the chevron apexes into a corresponding boundary layer 20b of the core exhaust which flows along the chevrons during operation.

As in the previous patent described above in the background section, the individual chevrons 34 may be inclined radially inwardly, or inclined radially outwardly, or may alternate inwardly and outwardly as desired for enhancing aerodynamic performance and sound attenuation. Penetration of the chevrons may nevertheless be increased over the reference nozzle either radially inwardly into the core exhaust, or radially outwardly into the fan exhaust.

In the exemplary embodiment illustrated in FIG. 5, the chevrons are inclined radially inwardly to penetrate the boundary layer of core exhaust flowing along the inner surface of the core nozzle. And, that penetration E may be effected in any suitable manner by controlling the axial curvature of the chevron using the second radius B for sufficiently penetrating the boundary layer and promoting vortex generation for enhancing mixing performance.

In the preferred embodiment illustrated in FIG. 5, the chevrons 34 are positioned in major part axially forward of the reference nozzle outlet and in minor part axially aft of the reference nozzle outlet so that the two distances C,D are respectively about 65% and 35% of the total chevron length. This is also illustrated in FIG. 4. Furthermore, the nozzle shelf 36 preferably terminates with its trailing edge disposed axially aft of the reference nozzle outlet by the spacing F, which positions the trailing edge of the shelf at about sixty percent of the total axial length of the chevrons from their respective bases.

As illustrated in the various FIGS. 1–4, the chevron apexes 34c are preferably circumferentially arcuate without a sharp point, and the intervening slots 38 between adjoining chevrons have complementary arcuate fillets or webs with similar radii of curvature. The corresponding bullnose apexes and curved webs improve durability of the chevron nozzle by reducing stress therein during operation; improve the manufacturing of the chevrons, whether in cut sheet metal or a machined ring; and increase safety by eliminating sharp points. All of these advantages accrue with the fundamental noise attenuation of the circumferentially truncated chevron nozzle described above.

As shown in FIGS. 1 and 3, the pylon 14 is disposed radially and outwardly from the nozzle shelf 36 for supporting the entire engine, and in turn the core nozzle 16 to the aircraft, below its wing for example. As shown in FIG. 3, the nozzle shelf 36 extends in circumferential length symmetrically below the pylon 14 over a circumferential spacing G which is slightly less than the ninety degree pitch spacing between the two terminal chevrons 34a.

In the exemplary embodiment illustrated in FIG. 3 the pylon 14 includes a lower or bottom surface in the form of a fairing 14a which is preferably spaced radially outwardly from the nozzle shelf 36 by a relatively small value less than about a centimeter. As shown in FIG. 1 the fairing 14a extends aft from the nozzle shelf and continues past the centerbody 30. And, the nozzle shelf 36 as illustrated best in FIG. 3 extends circumferentially outwardly from opposite sides of the pylon to space the terminal chevrons 34a suitably away therefrom.

In the exemplary embodiment illustrated, the circumferential extent of the pylon 14 is about forty five degrees, with the two terminal chevrons 34a having a pitch spacing of about ninety degrees, which is about twice the circumferential extent of the pylon in the axial plane of the nozzle shelf. The nozzle shelf thusly offsets the two terminal chevrons from the pylon for uncoupling aerodynamic performance therewith for enjoying the sound attenuation benefits of the chevron exhaust nozzle, without increasing noise with the introduction of chevrons in the place of the nozzle shelf.

Figure 7:
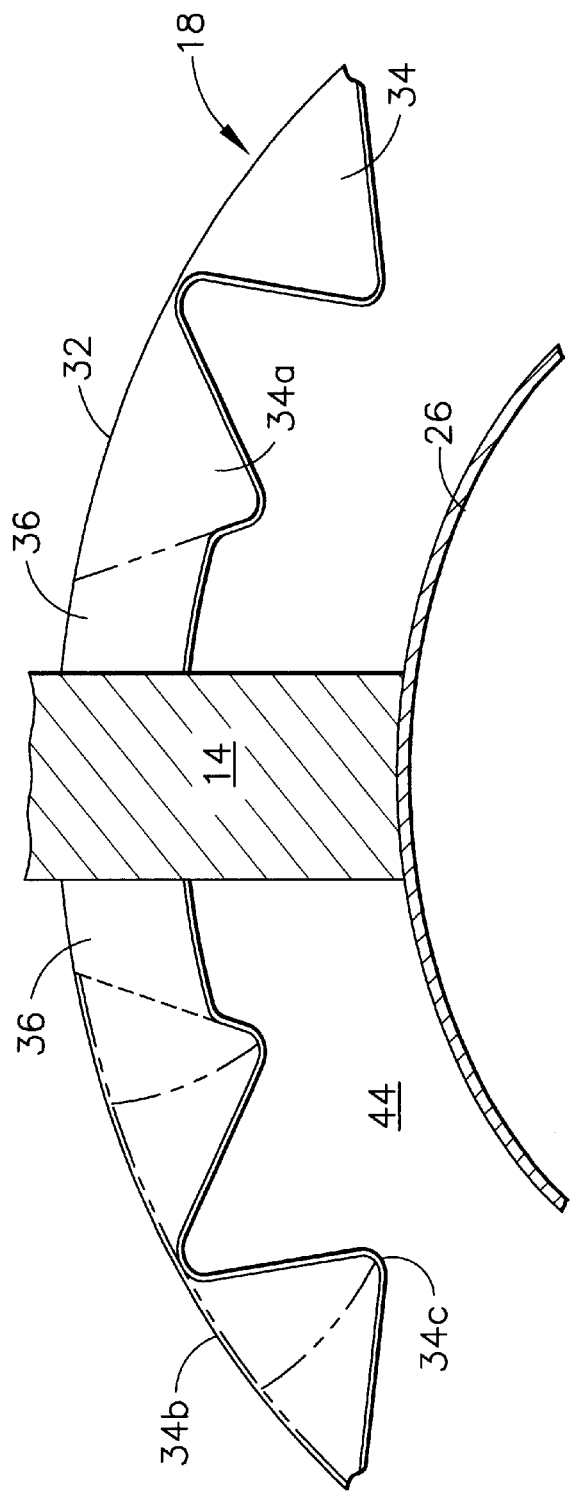
FIG. 7 is an aft-looking-forward elevational end view of a portion of the fan nozzle illustrated in FIG. 1 and taken along line 7—7.

The various features of the truncated chevron core nozzle 16 may be used with suitable modification for the fan nozzle 18 illustrated in FIGS. 1 and 7. In this embodiment, the chevron fan nozzle 18 is spaced radially outwardly from the nacelle of the core engine 26 to define a substantially annular fan nozzle outlet 44 through which the fan exhaust stream 22 is discharged during operation. The pylon 14 illustrated in FIG. 1 typically extends upstream along the core engine and through a portion of the fan nacelle which circumferentially interrupts the fan outlet 44 as illustrated in FIG. 7.

Like the core nozzle 16 described above in considerable detail, the fan nozzle 18 may be similarly configured with a plurality of the circumferentially adjoining triangular chevrons 34 and the intervening shelf 36 at the location of the pylon 14. Since the chevrons and nozzle shelf have substantially the same configurations and attributes as those found in the core nozzle, the same reference numbers are used for corresponding elements thereof with corresponding configurations and performance.

However, since the pylon interrupts the fan outlet 44, the corresponding nozzle shelf 36 for the fan nozzle 18 is circumferentially discontinuous or interrupted equidistantly between the terminal chevrons 34a to bifurcate the shelf in to two opposite portions. The pylon is disposed circumferentially between the two shelf portions for supporting the engine and in turn the fan nozzle to the wing of the aircraft.

As shown in FIGS. 1 and 7 the core engine 26 includes a surrounding nacelle disposed coaxially inside the exhaust duct of the fan nozzle 18. The core nacelle extends in part aft from the chevrons and shelf portions, as well as forward in part therefrom. In this way, the fan exhaust 22 discharged from the fan nozzle mixes with the ambient airflow over the outside of the fan nacelle along the serpentine edges provided by the triangular chevrons. Mixing of the two streams is promoted for reducing noise from the fan exhaust during operation.

Whereas testing has shown that eight chevrons provide optimum performance for the core nozzle 16, additional testing has shown that sixteen chevrons provide optimum sound attenuation performance for the fan nozzle 18. As shown in FIGS. 1 and 7, the sixteen fan nozzle chevrons may extend over the bottom two hundred and seventy degree extent of the fan nozzle at an equal circumferential pitch therearound. And, the two terminal chevrons 34a disposed on opposite sides of the pylon may have a pitch spacing of ninety degrees bridging the intervening pylon.

The two portions of the nozzle shelf 36 extend circumferentially outwardly from opposite sides of the pylon to position the two terminal chevrons at a suitable spacing away from the sides of the pylon for effecting noise attenuation from the circumferentially truncated chevron fan nozzle 18 in a manner similar to that of the core nozzle.

Development and testing of the chevron core nozzle of the previous patent and under the present invention has shown substantial noise attenuation from the use thereof in aircraft gas turbine engines, such as turbofan engines. Where pylons do not affect the discharge flow from an exhaust nozzle, axisymmetric chevron exhaust nozzles may be used with equiangularly spaced apart chevrons and without a locally intervening nozzle shelf.

However, where a supporting pylon circumferentially interrupts a fan nozzle, or closely surrounds a core nozzle and extends in large width and length aft from the core nozzle, circumferentially truncated chevron nozzles according to the present invention may be used for attenuating noise. The axisymmetric and truncated chevron nozzles are mutually exclusive and should not be used interchangeably.

As indicated above, the use of an axisymmetric chevron nozzle in the vicinity of an interfering pylon can result in an increase in noise instead of the intended decrease in noise. The introduction of the relatively simple nozzle shelf and the corresponding circumferential offset of the chevrons therefrom regains substantial noise reduction from the chevron nozzles when used in conjunction with supporting pylons.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A gas turbine engine exhaust nozzle comprising:
   an annular exhaust duct for discharging exhaust from an aft end thereof;
   a plurality of circumferentially adjoining chevrons extending from said duct aft end around only an arcuate portion thereof leaving a plain arcuate shelf between terminal ones of said chevrons; and
   each of said chevrons has a triangular configuration and a compound arcuate contour both circumferentially and axially.

2. A nozzle according to claim 1 wherein:
   said chevrons converge from a base integral with said duct to an apex spaced aft from said base to define complementary diverging slots circumferentially between said chevrons for channeling said exhaust radially therethrough; and
   said shelf is circumferentially coextensive with said terminal chevrons.

3. A nozzle according to claim 2 wherein said shelf terminates axially forward of said chevron apexes.

4. A nozzle according to claim 3 wherein said compound arcuate contour of said terminal chevrons blends to a different contour at said adjoining shelf.

5. A nozzle according to claim 4 wherein said shelf is circumferentially arcuate and axially straight.

6. A nozzle according to claim 4 wherein said chevrons are axially concave radially inwardly.

7. A nozzle according to claim 4 wherein said chevrons are axially convex radially outwardly.

8. A nozzle according to claim 4 wherein said adjoining chevrons are spaced apart from each other at a substantially equal pitch spacing, with a larger circumferential pitch spacing between said terminal chevrons along said shelf.

9. A nozzle according to claim 8 wherein said shelf is circumferentially continuous between said terminal chevrons, and said exhaust duct is circumferentially continuous and coextensive with said shelf and chevrons.

10. A nozzle according to claim 9 further comprising a centerbody disposed coaxially inside said exhaust duct and extending in part aft from said chevrons and shelf.

11. A nozzle according to claim 10 consisting of eight of said chevrons.

12. A nozzle according to claim 11 wherein said terminal chevrons are spaced apart at a pitch spacing of about ninety degrees.

13. A nozzle according to claim 8 wherein said shelf terminates closer to said chevron apexes than to said chevron bases.

14. A method of sizing said exhaust nozzle according to claim 8 comprising:
   defining a reference nozzle having an outlet for discharging said exhaust; and
   locating said chevron bases axially forward of said reference nozzle outlet, and locating said chevron apexes axially aft thereof.

15. A method according to claim 14 further comprising:
   locating said chevron bases on said reference nozzle; and
   displacing said chevron apexes radially from said reference nozzle for increasing penetration of said chevron apexes into a boundary layer of exhaust flow along said chevrons.

16. A method according to claim 15 further comprising:
   positioning said chevrons in major part axially forward of said reference nozzle outlet, and in minor part axially aft thereof; and
   terminating said shelf axially aft of said reference nozzle outlet.

17. A nozzle according to claim 8 wherein said chevron apexes are arcuate, and said slots between adjoining chevrons are complementary arcuate.

18. A nozzle according to claim 17 further comprising a pylon disposed radially outwardly from said nozzle shelf for supporting said nozzle to an aircraft.

19. A nozzle according to claim 18 wherein said pylon includes a bottom fairing spaced radially outwardly from said nozzle shelf and extending aft therefrom past said centerbody, and said nozzle shelf extends circumferentially outwardly from opposite sides of said pylon.

20. A nozzle according to claim 8 wherein said shelf is circumferentially discontinuous equidistantly between said terminal chevrons to bifurcate said shelf into two portions.

21. A nozzle according to claim 20 further comprising a pylon disposed circumferentially between said shelf portions for supporting said nozzle to an aircraft.

22. A nozzle according to claim 20 further comprising a core engine nacelle disposed coaxially inside said exhaust duct, and extending in part aft from said chevrons and shelf portions.

23. A nozzle according to claim 22 consisting of sixteen of said chevrons.

24. A gas turbine engine core exhaust nozzle comprising:
   a circumferentially continuous core exhaust duct for discharging core engine combustion exhaust from an aft end thereof;
   a plurality of circumferentially adjoining chevrons extending from a circumferentially continuous arcuate shelf between terminal ones of said chevrons; and
   each of said chevrons has a triangular configuration and a compound arcuate contour both circumferentially and axially.

25. A nozzle according to claim 24 wherein:
   said chevrons converge from a base integral with said duct to an apex spaced aft from said base to define complementary diverging slots circumferentially between said chevrons for channeling said exhaust radially therethrough; and
   said shelf terminates axially forward of said chevron apexes and is circumferentially coextensive with said terminal chevrons.

26. A nozzle according to claim 25 consisting of eight of said chevrons each being axially concave radially inwardly and axially convex radially outwardly.

27. A nozzle according to claim 26 wherein said shelf is circumferentially arcuate and axially straight, and blends with said compound arcuate contour of said terminal chevrons.

28. A gas turbine engine fan exhaust nozzle comprising:
   a circumferentially discontinuous fan exhaust duct for discharging fan air exhaust from an aft end thereof;
   a plurality of circumferentially adjoining chevrons extending from said duct aft end around only an arcuate portion thereof leaving a circumferentially discontinuous arcuate shelf equidistantly between terminal ones of said chevrons; and each of said chevrons has a triangular configuration and a compound arcuate contour both circumferentially and axially.

29. A nozzle according to claim 28 wherein:

said chevrons converge from a base integral with said duct to an apex spaced aft from said base to define complementary diverging slots circumferentially between said chevrons for channeling said exhaust radially therethrough; and said shelf includes opposite portions circumferentially coextensive with said terminal chevrons and terminating axially forward of said chevron apexes.

30. A nozzle according to claim 29 consisting of sixteen of said chevrons each being axially concave radially inwardly and axially convex radially outwardly.

31. A nozzle according to claim 30 wherein said shelf portions are circumferentially arcuate and axially straight, and blend to said compound arcuate contour of said terminal chevrons.

\* \* \* \* \*

UNITED STATES PATENT AND TRADEMARK OFFICE
CERTIFICATE OF CORRECTION

PATENT NO.   : 6,532,729 B2
DATED        : March 18, 2003
INVENTOR(S)  : Steven Martens It is certified that error appears in the above-identified patent and that said Letters Patent is hereby corrected as shown below:

<u>Title page, Item [54] and Column 1, lines 2 and 3,</u>
Delete words "FOR" to "SIGNATURE" so the title reads:
-- SHELF TRUNCATED CHEVRON EXHAUST NOZZLE --.

<u>Column 10,</u>
Line 21, delete the second occurrence of "said" and substitute therefor -- a --.

Signed and Sealed this

Twelfth Day of August, 2003

JAMES E. ROGAN
*Director of the United States Patent and Trademark Office*